United States Patent
Koya et al.

(10) Patent No.: US 6,284,696 B1
(45) Date of Patent: Sep. 4, 2001

(54) MESOPORE MOLECULAR SIEVE AND PROCESS FOR THE PRODUCTION THEREOF

(75) Inventors: Masahiko Koya, Tokyo; Hitoshi Nakajima, Yokohama; Itsuho Aishima, Fujisawa, all of (JP)

(73) Assignees: Asahi Kasei Kogyo Kabushiki Kaisha, Osaka; The Noguchi Institute, Tokyo, both of (JP)

( * ) Notice: Subject to any disclaimer, the term of this patent is extended or adjusted under 35 U.S.C. 154(b) by 0 days.

(21) Appl. No.: 09/202,046

(22) PCT Filed: Jun. 6, 1997

(86) PCT No.: PCT/JP97/01933

§ 371 Date: Mar. 23, 1999

§ 102(e) Date: Mar. 23, 1999

(87) PCT Pub. No.: WO97/46743

PCT Pub. Date: Dec. 11, 1997

(30) Foreign Application Priority Data

Jun. 7, 1996 (JP) .................................................... 8-166623

(51) Int. Cl.$^7$ ...................................................... B01J 29/06
(52) U.S. Cl. .............................. 502/64; 502/60; 502/62; 502/63; 502/85; 423/701; 423/705; 423/708
(58) Field of Search ..................................... 423/701, 705, 423/708; 502/60, 62, 63, 64, 85

(56) References Cited

U.S. PATENT DOCUMENTS 5,145,816 * 9/1992 Beck et al. .............................. 502/60

FOREIGN PATENT DOCUMENTS

| | | |
|---|---|---|
| 3208598 A1 | 9/1983 | (DE) . |
| 0533312 A1 | 3/1993 | (EP) . |
| 1-226713 * | 9/1989 | (JP) . |
| 3-176423 | 7/1991 | (JP) . |
| 5-254827 | 10/1993 | (JP) . |

OTHER PUBLICATIONS

Lim et al. "Synthesis and Characterization of a reactive Vinyl–Functionalized MCM–41: Probing the internal Pore Structure by a Bromination Reaction", Apr. 30, 1997; J. Am. Chem Soc. 119, pp. 4090–4091.*

Burkett et al. "Synthesis of hybrid inorganic–organic mesoporous silica by co–condensation of siloxane and organosiloxane precursors", Jun. 6, 1996; Chem. Commun. 11, pp. 1367–1368.*

Brunel et al. "MCM–41 type silicas as supports for immobilized catalysts", Zeolites: A Refined Tool for designing Catalytic Sites, 1995, pp. 173–180.*

Cauvel et al. "Functionalization of Y zeolites with organosilane reagents", Studies in Surface Science and Catalysis, vol. 94. pp. 286–293.*

Fowler et al., "Synthesis and Characterization of ordered organo–silica–surfactant mesophases with functionalized MCM–41–type architecture", Sep. 21, 1997, Chem Commun. 18, pp. 1769–1770.*

Itoh et al., "Synthesis and Application of New Phenyl–Functionalized Zeolites as Protection Against Radical Bromination at the Benzylic Position", 1997, Synlett pp. 1450–1452.*

Li et al. "Synthesis of zeolites using organosilicon compounds as structure–directing agents", 1994, Microporous Materials 3, pp. 117–121.*

Lim et al. "Synthesis of Ordered Microporous Silicates with Organosulfur Surface Groups and Their Application as Solid Acid Catalysts", Jan. 1998, Chem. Mater. 10, pp. 467–470.*

Liu et al., "Hybrid Mesoporous Materials with Functionalized Monolayers", 1998, Adv. Mater. 10 (2) pp. 161–165.*

Macquarrie et al., "Aminopropylated MCMs as base catalysts: a comparison with aminopropylated silica", 1997, Chem. Commun. pp. 1781–1782.*

Maeda et al., "Synthesis of the First Microporous Aluminum Phosphonate with Organic Groups Covaently Bonded to the Skeleton", 1994, Angew. Chem. Int. Ed. Engl. 33 (22), pp. 2335–2337.*

Maeda et al., "Synthesis of a novel microporous crystal with organic groups covalently bonded to the skeleton", 1995, Studies in Surface Science and Catalysis 98, pp. 44–45.*

Subba Rao et al. "1,5,7–Triazabicyclo[4.4.0]dec–5–ene Immobilized in MCM–41: A Strongly Basic Porous Catalyst", 1997, Angew. Chem. Int. Engl. 36 (23), pp. 2661–2662.*

* cited by examiner

Primary Examiner—Tom Dunn
(74) Attorney, Agent, or Firm—Birch, Stewart, Kolasch & Birch, LLP

(57) ABSTRACT

A mesopore molecular sieve having a hydrocarbon group bonded directly to a silicon atom in the metal oxide skeleton constituting the molecular sieve, wherein the content of said hydrocarbon group is from 0.01 to 0.6 mol per mol of the metal oxide. Also disclosed is a process for producing a mesopore molecular sieve having a hydrocarbon atom bonded to a silicon atom in the molecular sieve skeleton, which comprises synthesizing the mesopore molecular sieve, in the presence of a template, from: a silane compound represented by the following formula (1):

$$R_nSiX_{(4-n)} \qquad (1)$$

wherein R represents a hydrocarbon group selected from $C_{1-16}$ hydrocarbon groups and hydrocarbon groups substituted with an N—, O-, S-, P- or halogen-containing group; n represents 1, 2 or 3; and X is selected from $C_{1-6}$ alkoxy groups, aryloxy groups, a hydroxyl group and halogen atoms and a plurality of X may be the same or different; and a metal oxide and/or a precursor thereof. According to this process for producing a mesopore molecular sieve, a mesopore molecular sieve can be readily synthesized in one stage and, in addition, a mesopore molecular sieve having an excellent performance as an acid catalyst or oxidation catalyst can be obtained because the kind and amount of the hydrocarbon group can be easily adjusted.

9 Claims, 3 Drawing Sheets

MESOPORE MOLECULAR SIEVE AND PROCESS FOR THE PRODUCTION THEREOF

This application is the national phase under 35 U.S.C. §371 of prior PCT International Application No. PCT/JP97/01933 which has an International filing date of Jun. 6, 1997 which designated the United States of America.

TECHNICAL FEILD

The present invention relates to a mesopore molecular sieve and a production process thereof.

BACKGROUND ART

A mesopore molecular sieve is a new material which is expected, as an inorganic porous substance having a uniform pore size in a mesopore region, to be used in wide applications such as catalysts and adsorbents. U.S. Pat. Nos. 5,098,684, 5,102,643 and 5,108,725 and JP-W-A-5-503499 (the term "JP-W-A" as used herein means a "published Japanese national stage of international application") disclose a process for synthesizing a mesopore molecular sieve by using, as a template, a quaternary ammonium salt or phosphonium salt having a long-chain alkyl group and conducting hydrothermal synthesis.

JP-A-4-238810 (the term "JP-A" as used herein means an "unexamined published Japanese patent application") discloses a process for synthesizing a mesopore molecular sieve by treating a layered silica with a long-chain alkyl ammonium cation in accordance with an ion exchange method.

JP-A 5-254827 discloses a process for modifying a synthesized mesopore molecular sieve, which comprises treating the sieve with an alkylsilane coupling agent having a methyl group, etc. reactions with a silanol group etc. which exists on the surface of the mesopore skeleton, thereby adding an alkylailyl group to control the pore size or adding a trimethylailyl group to modify the surface.

An object of the present invention is to provide a novel mesopore molecular sieve which has a hydrocarbon group bonded directly to a silicon atom constituting the skeleton of the molecular sieve and a production process thereof.

DISCLOSURE OF THE INVENTION

In one aspect of the present invention, the present invention relates to a mesopore molecular sieve having a hydrocarbon group bonded directly to a silicon atom in the metal oxide skeleton constituting the molecular sieve, wherein the content of said hydrocarbon group is from 0.01 to 0.6 mol per mol of the metal oxide. In another aspect, the present invention relates to a process for producing a mesopore molecular sieve having a hydrocarbon atom bonded to a silicon atom in the molecular sieve skeleton, which comprises synthesizing the mesopore molecular sieve, in the presence of a template, from:

a silane compound represented by the following formula (1):

$$R_nSiX_{(4-n)} \quad (1)$$

wherein R represents a hydrocarbon group selected from $C_{1-6}$ hydrocarbon groups and hydrocarbon groups substituted with an N-, O-, S-, P- or halogen-containing group; n represents 1, 2 or 3; and X is selected from $C_{1-6}$ alkoxy groups, aryloxy groups, a hydroxyl group and halogen atoms and a plurality of X may be the same or different; and a metal oxide and/or a precursor thereof.

BEST MODES FOR CARRYING OUT THE INVENTION

Figure 1:
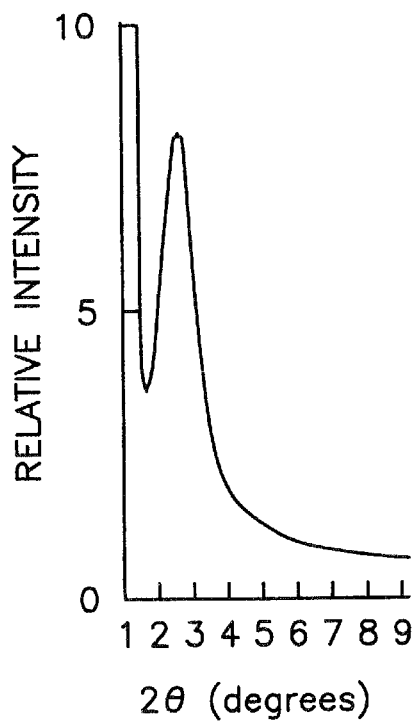
FIG. 1 illustrates an X-ray diffraction pattern of the methyl-containing mesopore molecular sieve synthesized in Example 1.

The present invention is described in detail below.

The term "mesopore molecular sieve" as used herein means a mesopore molecular sieve which is a porous substance having a uniform pore size of 1.5 to 10 nm in the mesopore region and has a hydrocarbon group bonded directly to a silicon atom in the metal oxide constituting the skeleton.

The silane compound for use in the present invention is one represented by the above-described formula (1), wherein examples of the hydrocarbon group represented by R include $C_{1-6}$ hydrocarbon groups or hydrocarbon groups substituted with an N-, O-, S-, P- or halogen-containing group.

Specific examples of the hydrocarbon group include saturated or unsaturated $C_{1-6}$ hydrocarbon groups and $C_{1-16}$ hydrocarbon groups substituted with an N-, O-, S-, P- or halogen-containing group. Examples of the substituted hydrocarbon group include heterocyclic hydrocarbon groups each of which contains any one hetero atom of N, O, S and P, and saturated or unsaturated hydrocarbon groups each substituted with a group such as —OH, —SH, —OR', —SR', —COOR', —OCOR', —NO$_2$, —SO2, —SO$_3$H and —PO(OH)$_2$, a halogen atom or the like. In the above formula, R' represents a saturated or unsaturated hydrocarbon group.

Specific examples include linear alkyl groups such as methyl, ethyl, propyl, butyl, pentyl, hexyl, heptyl, octyl, nonyl, decyl, undecyl, dodecyl, tridecyl, tetradecyl, pentadecyl and hexadecyl; cyclic hydrocarbon groups such as cyclohexyl and cyclooctyl; unsaturated aliphatic hydrocarbon groups such as vinyl, propenyl, butenyl, pentenyl, hexenyl, heptenyl, octenyl, nonenyl, decenyl, undecenyl, dodecenyl, tridecenyl, tetradecenyl, pentadecenyl and hexadecenyl; cycloolefin such as cyclopentenyl, cyclopentadienyl, cyclohexenyl, cyclohexadienyl and cyclooctadienyl; cyclic ring-subsbtituted alkyl groups; alkyl groups substituted with an aryl or aromatic group such as phenyl, tolyl, xylyl, naphthyl and methylnaphthyl; and the above-exemplified groups substituted with a halogen atom such as perfluoroalkyl group, hydrofluoroalkyl group and chloro-sustituted alkyl group, more specifically, 3-chloropropyl group, trifluoropropyl group, pentafluorobutyl group, heptafluoropentyl group and heptadecafluorotetrahydrodecyl group.

The substituent represented by X is selected from $C_{1-6}$ alkoxy groups, aryloxy groups, a hydroxyl group and halogen atoms, and if there exist a plurality of X, they may be the same or different. Examples of the alkoxy group include alkoxy and phenbxy groups such as methoxy, ethoxy, propoxy, butoxy, pentyloxy and hexyloxy, of which the methoxy and ethoxy are preferred.

n stands for an integer of 1 to 3. For example, when n stands for 1, the silane compound is a trialkoxyalkylsilane, when n stands for 2, the silane compound is a dialkoxydialkylsilane, and when n stands for 3, the silane compound is a monoalkoxytrialkylsilane. Among them, n preferably stands for 1, because in this case, the silane compound is more firmly incorporated in the skeleton.

Preferred examples of the silane compound include those represented by the following formula (2):

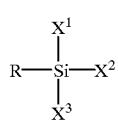

(2)

wherein:
R: a hydrocarbon group selected from $C_{1-16}$ hydrocarbon groups and hydrocarbon groups substituted with an N-, O-, S-, P- or halogen-containing group,
$X^1$, $X^2$, $X^3$ each selected from $C_{1-6}$ alkoxy groups, aryloxy groups, a hydroxyl group and halogen atoms. Specific examples of the compound represented by formula (2) include monoalkyltrialkoxysilane and monoaryltrialkoxysilane.

As the template for synthesizing a mesopore substance, any known surfactants employed for the synthesis of a mesopore substance, such as long-chain quaternary ammonium salts, long-chain alkylamine N-oxides, long-chain sulfonates, polyethylene glycol alkyl ethers and polyethylene glycol fatty acid esters can be employed.

The term "metal oxide and/or precursor thereof" as used herein means a simple substance of silicon oxide or a complex between silicon oxide and an oxide of the metals exemplified below and/or a precursor thereof.

Examples of the metal species other than silicon include alkaline earth metal elements such as magnesium and calcium and zinc, belonging to Group II; boron, aluminum, gallium, yttrium and rare earth elements, belonging to Group III; titanium, zirconium, germanium and tin, belonging to Group IV; phosphorus and vanadium, belonging to Group V; chromium, molybdenum and tungsten, belonging to Group VI; manganese and rhenium, belonging to Group VII; iron, cobalt, nickel and noble metal elements e.g. ruthenium, rhodium, palladium and platinum, belonging to Group VIII. Among them, boron, aluminum, rare earth elements, titanium and vanadium are preferred.

The atomic ratio (Si/M) of a silicon atom to such a metal element (M) is 5 or higher, preferably 10 or higher.

Examples of the precursor of the above-described metal oxide include inorganic salts such as nitrate, sulfate and hydrochloride; carboxylates such as acetate, propionate and naphthenate; organic ammonium metal salts such as quaternary alkyl ammonium; and metal compounds such as alkoxides and hydroxides, each with the above-described metal. Among them, the metal alkoxides are used desirably.

Examples of the silicon oxide or precursor thereof include tetraalkoxysilane comprising methoxy, ethoxy, propoxy or the like, silica powder, aqueous glass and colloidal silica.

In the synthesis process of the present invention, at least one of water, alcohol and diol is usually employed as a solvent, of which an aqueous solvent containing water Is preferred.

In addition, as in the known process, it is possible to add auxiliary organics to change the pore size. Examplep thereof include $C_{6-20}$ aromatic hydrocarbons, $C_{5-20}$ alicyclic hydrocarbons, and $C_{3-16}$ aliphatic hydrocarbons, and the above-described hydrocarbons substituted with amine or halogen, such as dodecane, hexadecane, cyclododecane, trimethylbenzene and triethylbenzene.

In the reaction mixture comprising the source of silica (including the above-described silane compound), source of the other metal oxide, template and solvent, the molar ratio of the above-described silane compound/(metal oxide and/or precursor thereof) is 0.01 to 0.6, preferably 0.02 to 0.50, more preferably 0.05 to 0.40, the atomic ratio of silicon/metal element is at least 5, preferably at least 10, the molar ratio of silica/template is 1 to 30, preferably 1 to 10 and the molar ratio of the solvent/template is 1 to 1000, preferably 5 to 500.

When the metal oxide or precursor thereof, template or the like is a combination of two or more substances, the above molar ratio is calculated with an average molar molecular weight thereof.

The synthesis according to the process of the present invention is carried out under the conditions of a reaction temperature of from room temperature (20° C.) to 180° C., preferably from room temperature to 100° C., and reaction time of from 5 to 100 hours, preferably from 10 to 50 hours.

The reaction product is usually separated by filtration, washed sufficiently with water, dried and then subjected to a removing step to remove the template contained therein, for example, by extraction with an organic solvent such as alcohol, whereby a mesopore molecular sieve having a carbon-silicon bond can be obtained.

The mesopore substance containing a carbon-silicon bond, which substance has been synthesized according to the process of the present invention, can be treated with an ordinarily employed surface treating agent, for example, a silane coupling agent such as tetraalkoxysilane, monoalkyltolylalkoxysilane, dialkyldialkoxysilane or trialkylalkoxysilane, or an alkoxide of aluminum or boron, to modify the surface or regulate the pore size.

The mesopore molecular sieve according to the present invention has a substituent-containing hydrocarbon group bonded directly to a silicon atom in the metal oxide skeleton constituting the molecular sieve and the hydrocarbon group exists in an amount of 0.01 to 0.6 mol per mol of said metal oxide. The meeopore molecular sieve has following features.

Specifically, the mesopore molecular sieve according to the present invention has features that the hydrophobic property thereof can be easily controlled by adjusting the kind or amount of the hydrocarbon group and a hydrocarbon-containing catalytically active component can be incorporated.

The mesopore molecular sieve of the present invention can be used in a wide range of applications such as catalysts and adsorbents. For example, those having, in the mesopore skeleton, a catalytically active component having an acid function or an oxidation or reduction function, or those having a catalytically active component such as transition metal component carried thereon by an ion exchange or impregnation method, are useful as a catalyst having a hydrophobic reaction site. In addition, the mesopore molecular sieve can be used as a catalytic carrier which makes use of the hydrocarbon group bonded to a silicon atom in order to stabilize a homogeneous catalyst such as an organic metal complex, as a controlled hydrophobic adsorbent for the adsorption of various organic compounds, or for the controlled adsorption of water content such as a moisture conditioning material.

The present invention will be described in more detail with reference to the following Examples, but the invention is not limited thereto.

In examples, the X-ray diffraction pattern was measured using "Type RAD3" manufactured by Rigaku Denki, while the specific surface area and pore size distribution were measured by "Sorptomatic 1800" manufactured by Carlo Erba and a peak size of differential distribution determined by the BET and BJH methods using nitrogen was indicated as a pore size. The infrared absorption spectrum was measured by "Spectrometer Type 1600" manufactured by Perkin Elmer. The thermal analysis was carried out at a heating rate of 15° C./min using thermal analyzers "TGA-50" and "DTA-50" manufactured by Shimadzu Corporation.

EXAMPLE 1

In a 500-ml beaker, 80 g of ethanol and 10 g of dodecylamine were added to 100 g of distilled water to dissolve the former in the latter. Under stirring, 27.4 g of tetraethyl orthosilicate and 11.8 g of methyltriethoxysilane were added and after stirring for 30 minutes, the mixture in the form of a slurry was obtained. The mixture was allowed to stand at 30° C. for 20 hours and reacted. The reaction mixture was filtered, washed with water and then dried at 110° C. for 5 hours, whereby 15.5 g of the product was obtained as white powder. In order to remove the template (amine) from the dried product to obtain a mesopore substance, a 5 g portion of the dried product was dispersed in 750 ml of ethanol, followed by extraction at 60° C. for one hour and then filtration. This extraction and filtration procedure was repeated and carried out three times in total. The filtrate was washed with alcohol and then dried at 100° C. for 3 hours, whereby 3.4 g of a methyl-containing silica mesopore molecular sieve was obtained. The resulting powder exhibited water repellency and when added to water, it floated on the surface of the water.

The X-ray diffraction pattern of the resulting powder showed a strong peak at a d value of 32.5 Å (angstrom) (see FIG. 1).

Figure 2:
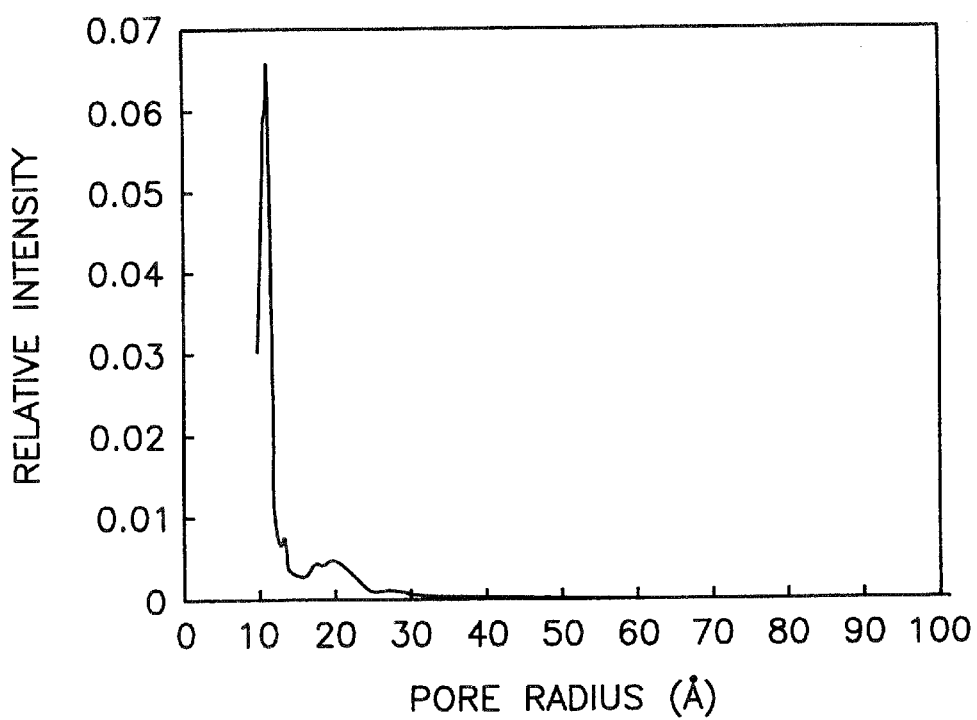
FIG. 2 illustrates a pore distribution of the methyl-containing mesopore molecular sieve synthesized in Example 1.

As a result of measuring the specific surface area and pore size distribution by the nitrogen adsorption and desorption method, it was found that the specific surface area was 1000 $m^2/g$ and pore size was 2.1 nm (see FIG. 2).

Figure 3:
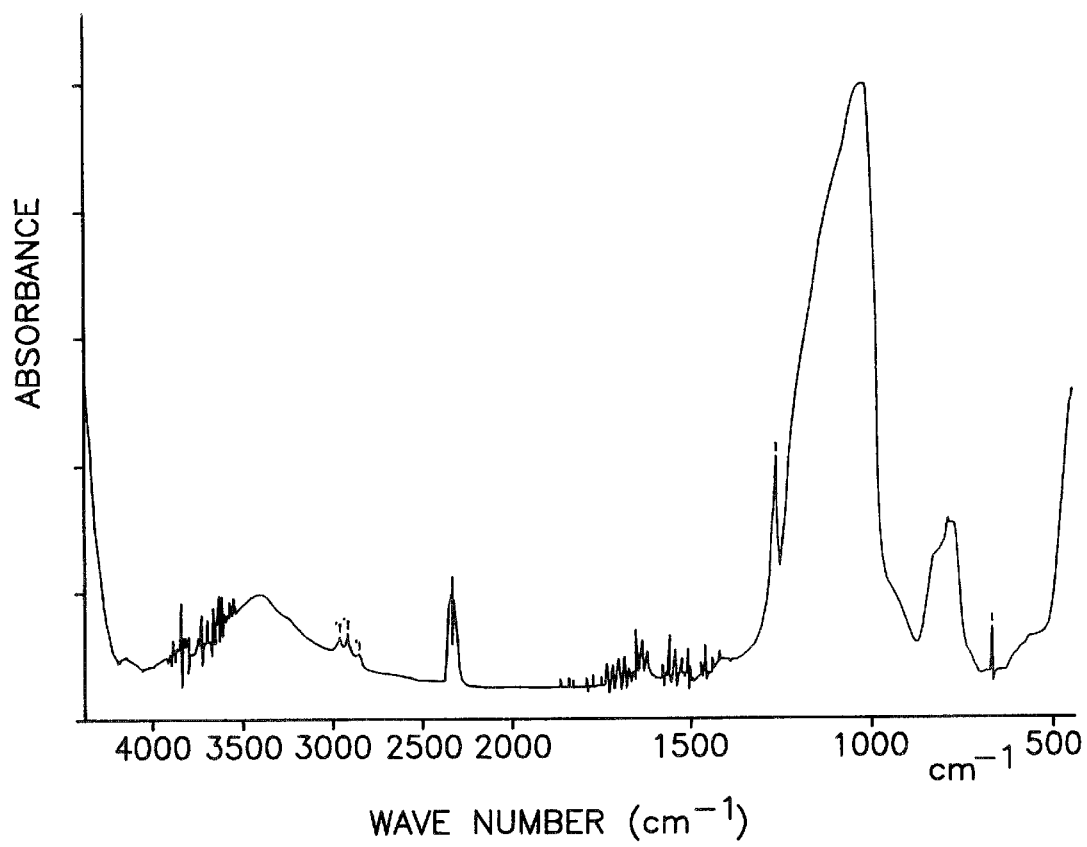
FIG. 3 illustrates an infrared absorption spectrum of the methyl-containing mesopore molecular sieve synthesized in Example 1.

As a result of measuring infrared absorption spectrum, an absorption peak attributable to deformation vibration of a $CH_3$—Si group was found at around 1270 $cm^{-1}$ (see FIG. 3).

Figure 4:
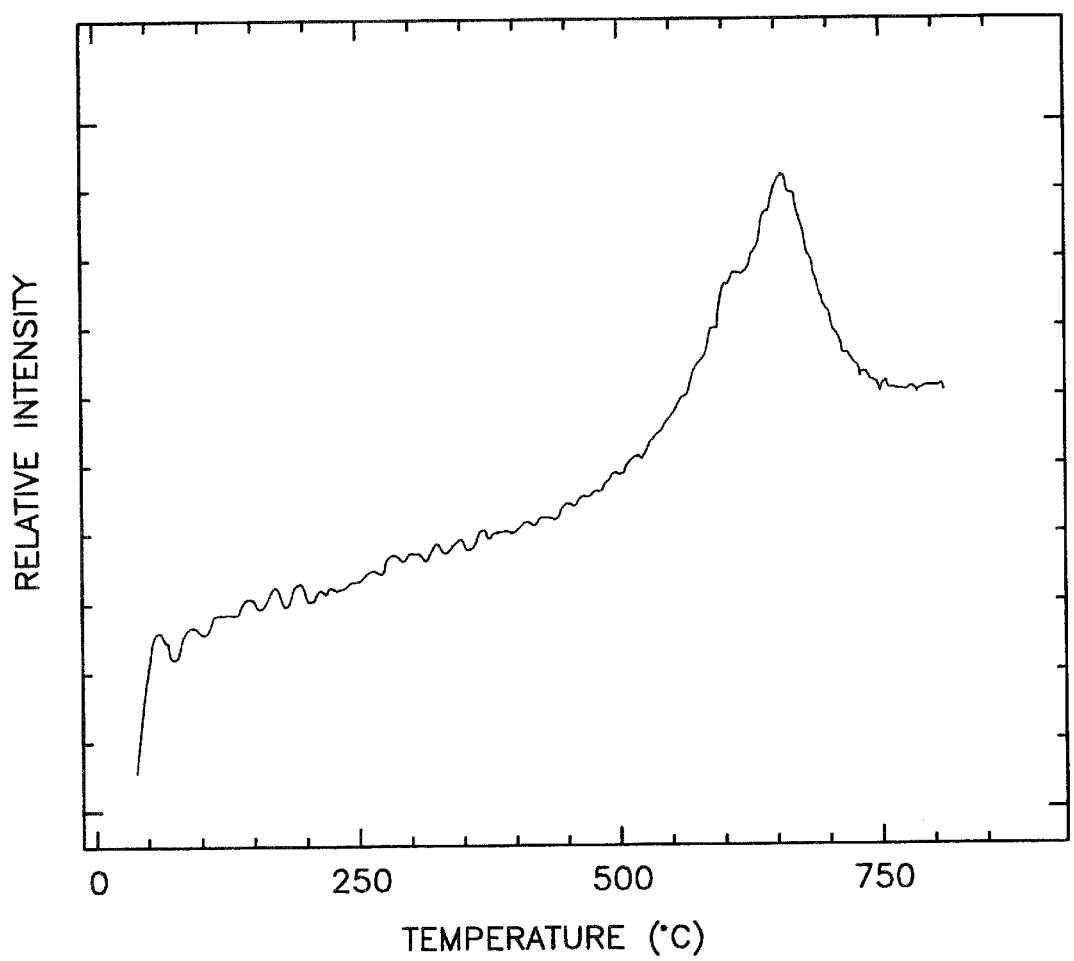
FIG. 4 illustrates a differential thermal analysis chart of the methyl-containing mesopore molecular sieve synthesized in Example 1.

As a result of differential thermal analysis (measured at a heating rate of 15° C./min in the air), weight reduction and exotherm peak were found at around 620° C. (see FIG. 4).

EXAMPLE 2

In the same manner as in Example 1, except that the amounts of tetraethyl orthosilicate and methyltriethoxysilane were changed to 33.2 g and 7.2 g, respectively, 17.1 g of a dried product was obtained. A 5 g portion of this dried sample was subjected to extraction treatment in the same manner as in Example 1, whereby 3.5 g of a methyl-containing silica mesopore substance was obtained.

The powder X-ray diffraction pattern of the extracted sample showed a strong peak at a d value of 3.28 Å.

As a result of measuring the specific surface area and pore size distribution of the sample by the nitrogen adsorption and desorption method, it was found that the specific surface area was 1100 $m^2/g$ and pore size was 2.4 nm. When calcined at 550° C., the sample did not exhibit water repellency, its powder X-ray diffraction peak showed a decreasing tendency with a d value of 31.4 Å, and its pore size showed a decreasing tendency to 2.1 nm.

EXAMPLE 3

In the same manner as in Example 1, except that the amounts of tetraethyl orthosilicate and methyltriethoxysilane were changed to 37.3 g and 3.6 g, respectively, 17.8 g of a dried product was obtained. A 5 g portion of the dried sample was subjected to extraction treatment in the same manner as in Example 1, whereby 3.4 g of a methyl-containing silica mesopore molecular sieve was obtained.

The powder X-ray diffraction pattern of the extracted sample exhibited a strong peak at a d value of 33.5 Å.

As a result of measuring the specific surface are and pore size distribution of the sample by the nitrogen adsorption and desorption method, it was found that the specific surface area was 1040 $m^2/g$ and the pore size was 2.5 nm.

EXAMPLE 4

In the same manner as in Example 1, except that 10 g of decylamine was used as a template instead of dodecylamine, 16.4 g of white powder was obtained. From a 5 g portion of the white powder, the template was removed in the same manner as in Example 1, whereby 3.5 g of a methyl-containing silica mesopore molecular sieve was obtained.

The powder X-ray diffraction pattern of the product exhibited a strong peak at a d value of 29.6 Å.

As a result of measuring the specific surface are and pore size distribution of the product by the nitrogen adsorption and desorption method, it was found that the specific surface area was 1020 $m^2/g$ and the pore size was 1.9 nm.

EXAMPLE 5

In the same manner as in Example 1, except that 11.6 g of tetradecylamine was used as a template instead of dodecylamine, 15.0 g of white powder was obtained. From a 5 g portion of the white powder, the template was removed in the same manner as in Example 1, whereby 3.8 g of a methyl-containing silica mesopore molecular sieve was obtained.

The powder X-ray diffraction pattern of the product exhibited a strong peak at a d value of 34.0 Å.

As a result of measuring the specific surface area and pore size distribution of the product by the nitrogen adsorption and desorption method, it was found that the specific surface area was 970 $m^2/g$ and the pore size was 2.1 nm.

EXAMPLE 6

In the same manner as in Example 1, except that 13.0 g of hexadecylamine was used as a template instead of dodecylamine and that the amount of ethanol was changed to 90 ml, 17.1 g of white powder was obtained. From a 5 g portion of the white powder, the template was removed in the same manner as in Example 1, whereby 3.3 g of a methyl-containing silica mesopore molecular sieve was obtained.

The powder X-ray diffraction pattern of the product exhibited a strong peak at a d value of 36.7 Å.

As a result of measuring the specific surface are and pore size distribution by the nitrogen adsorption and desorption method, it was found that the specific surface area was 980 $m^2/g$ and the pore size was 2.3 nm.

EXAMPLE 7

In the same manner as in Example 2, except that 7.6 g of ethyltriethoxysilane was used instead of methyltriethoxysilane, 17.5 g of a dried product was obtained. A 10 g portion of the product was extracted in the same manner as in Example 2, whereby 6.7 g of white powder was obtained. The resulting powder exhibited water repellency and when suspended in water, it floated on the surface of the water.

The powder X-ray diffraction pattern of the product exhibited a strong peak at a d value of 32.9 Å.

An a result of measuring the specific surface are and pore size distribution by the nitrogen adsorption and desorption method, it was found that the specific surface area was 1050 $m^2/g$ and the pore size was 2.2 nm.

EXAMPLE 8

In the same manner as in Example 2, except that 9.6 g of n-octyltriethoxysilane was used instead of methyltriethoxysilane, 20.6 g of a dried product was obtained. A 10 g portion of the product was extracted in the same manner as in Example 2, whereby 6.2 g of white powder was obtained. The resulting powder exhibited water repellency and when added to water, it floated on the surface of the water.

The powder X-ray diffraction pattern of the product exhibited a strong peak at a d value of 35.3 Å.

As a result of measuring the specific surface are and pore size distribution by the nitrogen adsorption and desorption method, it was found that the specific surface area was 990 $m^2/g$ and the pore size was 2.2 nm.

EXAMPLE 9

In the same manner as in Example 2, except that 9.6 g of phenyltriethoxysilane was used instead of methyltriethoxysilane, 19.2 g of a dried product was obtained. A 10 g portion of the product was extracted in the same manner as in Example 2, whereby 6.5 g of white powder was obtained. The resulting powder exhibited water repellency and when added to water, it floated on the surface of the water.

The powder X-ray diffraction pattern of the product exhibited a strong peak at a d value of 32.5 Å.

As a result of measuring the specific surface are and pore size distribution by the nitrogen adsorption and desorption method, it was found that the specific surface area was 1000 $m^2/g$ and the pore size was 2.2 nm.

As a result of measuring infrared absorption spectrum, absorption peaks attributable to a phenyl-silicon bond were observed at around 1430 $cm^{-1}$ and 1130 $cm^{-1}$.

EXAMPLE 10

In the same manner as in Example 2, in a 1000-ml beaker, 240 g of ethanol and 30 g of dodecylamine were added to 300 g of distilled water to dissolve the former in the latter. Under stirring, 99.6 g of tetraethyl orthosilicate and 21.6 g of methyltriethoxysilane were added, followed by the addition of 8.2 g of aluminum isopropoxide. After stirring for about 30 minutes, the mixture in the form of a slurry was obtained. The mixture was allowed to stand at 30° C. for 22 hours and reacted. The reaction mixture was filtered, washed with water and then dried at 110° C. for 5 hours, whereby 58 g of the product was obtained as white powder. In order to remove the template (amine) from the dried product to obtain a mesopore substance, a 5 g portion of the dried product was dispersed in 750 ml of a hydrochloric-acid-acidic ethanol (solution containing a 0.1 mol-HCl/l). The dispersion was extracted at 60° C. for one hour, followed by filtration. This template-removing procedure was repeated twice, in addition. The filtrate was washed with alcohol and then dried at 100° C. for 3 hours, whereby 3.1 g of a methyl-containing silica.alumina mesopore molecular sieve was obtained. The powder thus obtained exhibited water repellency and when added to water, it floated on the surface of water.

The X-ray diffraction pattern of the resulting powder showed a strong peak at a d value of 33.0 Å.

The atomic ratio of silicon to aluminum was found to be 14 as a result of fluorescent X-ray spectrophotometry.

As a result of measuring the specific surface area and pore size distribution by the nitrogen adsorption and desorption method, it was found that the specific surface area was 920 $m^2/g$ and pore size was 2.2 nm.

EXAMPLE 11

In the same manner as in Example 10, except for the use of 2.28 g of tetraethyl orthotitanate instead of aluminum isopropoxide, 55.6 g of dry white powder was obtained. A 5 g portion of the white powder was extracted in the same manner as in Example 2, whereby 3.4 g of methyl-containing silica.titania mesopore molecular sieve was obtained. The resulting powder exhibited water repellency and when added to water, it floated on the surface of the water.

The X-ray diffraction pattern of the resulting powder showed a strong peak at a d value of 32.5 Å.

The atomic ratio of silicon to titanium was found to be 65 as a result of fluorescent X-ray spectrophotometry.

As a result of measuring the specific surface area and pore size distribution by the nitrogen adsorption and desorption method, it was found that the specific surface area was 1100 $m^2/g$ and pore size was 2.2 nm.

EXAMPLE 12

In the same manner as in Example 2, except for the use of 8.4 g of 3-trifluoropropyltrimethoxysilane instead of methyltriethoxysilane, 19. g of a dried product was obtained. A 10 g portion of the product was extracted in the same manner as in Example 2, whereby 6.5 g of white powder was obtained. The resulting powder exhibited water repellency and when added to water, it floated on the surface of the water.

The X-ray diffraction pattern of the resulting powder showed a strong peak at a d value of 32.1 Å.

As a result of measuring the specific surface area and pore size distribution by the nitrogen adsorption and desorption method, it was found that the specific surface area was 1100 $m^2/g$ and pore size was 2.3 nm.

As a result of measuring infrared absorption spectrum, absorption peaks attributable to a $CF_3$ group were observed at around 1320 $cm^{-1}$, 1269 $cm^{-1}$ and 1218 $cm^{-1}$.

EXAMPLE 13

In the same manner as in Example 2, except for the use of 9.6 g of 3-chloropropyltriethoxysilane instead of methyltriethoxysilane, 20 g of a dried sample was obtained. A 10 g portion of the sample was extracted in the same manner as in Example 2, whereby 7 g of white powder was obtained. The resulting powder exhibited water repellency and when added to water, it floated on the surface of the water.

The X-ray diffraction pattern of the resulting powder showed a strong peak at a d value of 34.6 Å.

As a result of measuring the specific surface area and pore size distribution by the nitrogen adsorption and desorption method, it was found that the specific surface area was 900 m$^2$/g and pore size was 2.3 nm.

EXAMPLE 14

In the same manner as in Example 2, except that the amount of tetraethyl orthosilicate was changed to 38 g and that 5.4 g of 3-cyclopentadienylpropyltriethoxysilane (dimer) was used instead of methyltriethoxysilane, 18 g of a dried sample was obtained. A 10 g portion of the sample was extracted with alcohol in the same manner as in Example 1, whereby 6.9 g of white powder was obtained. The resulting powder exhibited water repellency and when added to water, it floated on the surface of the water.

The X-ray diffraction pattern of the resulting powder showed a strong peak at a d value of 33 Å.

As a result of measuring the specific surface area and pore size distribution by the nitrogen adsorption and desorption method, it was found that the specific surface area was 850 m$^2$/g and pore size was 2.0 nm.

EXAMPLE 15

In the same manner as in Example 2, except for the use of 12 g of dodecyltriethoxysilane instead of methyltriethoxysilane, 21 g of a dried sample was obtained. A 10 g portion of the sample was extracted with alcohol in the same manner as in Example 1, whereby 7.2 g of white powder was obtained. The resulting powder exhibited water repellency and when added to water, it floated on the surface of the water.

The X-ray diffraction pattern of the resulting powder showed a strong peak at a d value of 39 Å.

As a result of measuring the specific surface area and pore size distribution by the nitrogen adsorption and desorption method, it was found that the specific surface area was 830 m$^2$/g and pore size was 2.6 nm.

EXAMPLE 16

In the same manner as in Example 2, except that 6 g of n-dodecane was used together with dodecylamine for the synthesis, 18 g of a dried sample of a methyl-containing silica mesopore molecular sieve was obtained. A 10 g portion of the sample was extracted with alcohol in the same manner as in Example 1, whereby 6.2 g of white powder was obtained. The resulting powder exhibited water repellency and when added to water, it floated on the surface of the water.

The X-ray diffraction pattern of the resulting powder showed a strong peak at a d value of 36 Å.

As a result of measuring the specific surface area and pore size distribution by the nitrogen adsorption and desorption method, it was found that the specific surface area was 860 m$^2$/g and pore size was 3 nm.

EXAMPLE 17

In the same manner as in Example 2, except for the use of 5.9 g of dimethyldiethoxyeilane instead of methyltriethoxysilane, 15 g of a dried sample of a methyl-containing silica mesopore molecular sieve was obtained. A 10 g portion of the sample was extracted with alcohol in the same manner as in Example 1, whereby 7.2 g of white powder was obtained. The resulting powder exhibited water repellency and when added to water, it floated on the surface of the water.

The X-ray diffraction pattern of the resulting powder showed a strong peak at a d value of 32.6 Å.

As a result of measuring the specific surface area and pore size distribution by the nitrogen adsorption and desorption method, it was found that the specific surface area was 1060 m$^2$/g, pore volume was 0.76 cc/g and pore size was 2.3 nm.

As a result of infrared absorption spectrum, an absorption peak attributable to a Si—CH$_3$ group was observed at around 1265 cm$^{-1}$.

EXAMPLE 18

In the same manner as in Example 2, except for the use of 9.4 g of trimethylethoxysilane instead of methyltriethoxysilane for the synthesis, 15 g of a dried sample of a methyl-containing silica mesopore molecular sieve was obtained. A 10 g portion of the sample was extracted with alcohol in the same manner as in Example 1, whereby 6.9 g of white powder was obtained. The resulting powder exhibited water repellency and when added to water, it floated on the surface of the water.

The X-ray diffraction pattern of the resulting powder showed a strong peak at a d value of 33.4 Å.

As a result of measuring the specific surface area and pore size distribution by the nitrogen adsorption and desorption method, it was found that the specific surface area was 900 m$^2$/g, pore volume was 0.65 cc/g and pore size was 2.2 nm.

As a result of infrared absorption spectrum, an absorption peak attributable to a Si—CH$_3$ group was observed at around 1255 cm$^{-1}$.

EXAMPLE 19

In the same manner as in Example 2, except that 16.5 g of octylchlorosilane was used instead of methyltriethoxysilane and aqueous ammonia was added to adjust pH to 10, 14.5 g of a dried sample of a octyldimethyloilyl-containing silica mesopore molecular sieve was obtained. A 10 g portion of the sample was extracted with alcohol in the same manner as in Example 1, whereby 7.9 g of white powder was obtained. The resulting powder exhibited water repellency and when added to water, it floated on the surface of the water.

The X-ray diffraction pattern of the resulting powder showed a strong peak at a d value of 41.9 Å.

As a result of measuring the specific surface area and pore size distribution by the nitrogen adsorption and desorption method, it was found that the specific surface area was 800 m$^2$/g, pore volume was 0.76 cc/g and pore size was 2.4 nm.

As a result of infrared absorption spectrum, an absorption peak attributable to a Si—CH$_3$ group was observed at around 1257 cm$^{-1}$.

EXAMPLE 20

In a 500-ml beaker, 4.8 g of polyoxyethylene (polymerization degree: 10) octylphenyl ether were added to 300 g of distilled water to dissolve the former in the latter. Under stirring, 7.3 g of tetraethyl orthosilicate, 12 g of tetramethyl orthosilicate and 6.5 g of methyltriethoxysilane were added. The resulting mixture was reacted under stirring by a stirrer at room temperature for 2.5 days. The reaction mixture was filtered, washed with water and then dried at 110° C. for 5 hours, whereby 12.4 g of a dried product was obtained as white powder. In order to remove the template (amine) from the dried product to obtain a mesopore substance, a 5 g portion of the dried product was dispersed in 750 ml of ethanol and extracted therewith at 60° C. for one hour, followed by filtration. This extraction and filtration procedure was repeated and carried out three times in total. The filtrate was then washed with alcohol and dried at 100° C. for 3 hours, whereby 3.2 g of a methyl-containing silica mesopore molecular sieve was obtained. The resulting powder exhibited water repellency and when added to water, it floated on the surface of the water.

As a result of measuring the specific surface area and pore size distribution by the nitrogen adsorption and desorption method, it was found that the specific surface area was 880 $m^2/g$ and pore size was 2.5 nm.

As a result of infrared absorption spectrum, an absorption peak attributable to the deformation vibration of a $C_3$—Si group was observed at around 1280 $cm^{-1}$.

As a result of differential thermal analysis (measured at a heating rate of 15° C./min in the air), weight reduction and exotherm peak were found at around 640° C.

COMPARATIVE EXAMPLE 1

In the same manner as in Example 1, except that the amount of tetraethyl orthosilicate was changed to 41.6 g and methyl triethoxysilane was not added, the reaction was effected. The reaction mixture was filtered, washed with water and then dried at 110° C. for 5 hours, whereby 18.7 g of a dried product was obtained as white powder. In order to remove the template (amine) from the dried product to obtain a mesopore substance, a 10 g portion of the dried product was dispersed in 1500 ml of ethanol and extracted therewith at 60° C. for one hour, followed by filtration. This extraction and filtration procedure was repeated twice, in addition. The filtrate was then washed with alcohol and dried at 100° C. for 3 hours, whereby 6.5 g of a silica mesopore molecular sieve was obtained. The resulting powder did not exhibit water repellency and when added to water, it sank under water.

The powder X-ray diffraction pattern exhibited a strong peak at a d value of 36.2 Å.

As a result of measuring the specific surface area and pore size distribution of the powder by the nitrogen adsorption and desorption method, it was found that the specific surface area was 1000 $m^2/g$ and pore size was 3.1 nm.

As a result of infrared absorption spectrum, no absorption peak attributable to the deformation vibration of a $CH_3$—Si group was observed.

As a result of differential thermal analysis (measured at a heating rate of 15° C./min in the air), no exotherm peak was found at 400° C. or higher.

COMPARATIVE EXAMPLE 2

In order to remove the template (amine) from the dried powder synthesized in Comparative Example 1 and to obtain a mesopore substance, a 10 g portion of the dried product was calcined in the air at 250° C. for 2 hours and then at 550° C. for 3 hours, whereby 6.3 g of a mesopore substance was obtained. A 2 g portion of the resulting mesopore substance was dispersed in 20 g of trimethylsilyl chloride, as an ordinarily-employed alkylsilylating agent, and 30 g of hexamethyldisiloxane. Under stirring, the dispersion was treated for 20 hours under a reflux condition. The reaction mixture was then filtered, washed with acetone and dried. The sample so treated exhibited water repellency.

As a result of differential thermal analysis (measured at a heating rate of 15° C./min in the air), an exotherm peak was found at 450° C.

COMPARATIVE EXAMPLE 3

In order to remove the template (amine) from the dried powder synthesized in Comparative Example 1 and to obtain a mesopore substance, a 10 g portion of the dried product was calcined in the air at 250° C. for 2 hours and then at 550° C. for 3 hours, whereby 6.3 g of a silica mesopore substance was obtained. A 2 g portion of the resulting silica mesopore substance was filled in a quartz-made reaction tube and heated to 150° C. The tube was then fed with 100 cc/min of nitrogen and 10 cc/h of a 50/50 (volume) mixed solution of methyltrimethoxysilane and benzene for 2 hours. After completion of the feeding with the solution, only nitrogen was fed at the same temperature for one hour. The sample so treated was taken out after cooling.

As a result of differential thermal analysis (measured at a heating rate of 15° C./min in the air), an exotherm peak and weight reduction were found at around 520° C.

COMPARATIVE EXAMPLE 4

In the same manner as in Example 10, except that methyltriethoxysilane was not added and the amount of tetraethyl orthosilicate was changed to 123 g, a silicas alumina mesopore substance was obtained. In order to remove the template (amine) from the dried powder so synthesized and to obtain a mesopore substance, a 10 g portion of the dried product was calcined in the air at 250° C. for 2 hours and at 550° C. for 3 hours, whereby 6.4 g of a mesopore substance was obtained. A 5 g portion of the resulting mesopore substance was added to a solution of 3.6 g of methyltriethoxysilane in 50 ml of toluene, followed by silylation treatment at 100° C. for 9 hours, The reaction mixture was then filtered, washed sufficiently with acetone and then subjected to vacuum drying (at 150° C. and 1 mmHg for 3 hours), whereby 5.6 g of a treated sample was obtained.

As a result of measuring the specific surface area, pore volume and pore size distribution by the nitrogen adsorption and desorption method before and after the methylsilation, it was found that the specific surface area decreased from 900 $m^2/g$ to 700 $m^2/g$, the pore volume from 0.7 to 0.5 cc/g and pore size from 3 nm to 2.5 nm.

The sample was dispersed in benzene and the acid amount was determined by titration with a Dimethyl Yellow indicator (pKa=+3.3) in a 0.1 N n-butylamine benzene solution. As a result, it was confirmed that the acid amount showed a drastic reduction from 0.34 mmol/g to 0.14 mmol/g The acid amount of the sample, which had been synthesized in Example 10, was determined in the same manner as in the above-described method and was found to be 0.33 mmol/g, which suggests that the acid amount is high in the sample obtained by the process of the present invention.

As a result of dif ferential thermal analysis (measured at a heating rate of 15° C./min in the air), an exotherm peak and weight reduction were found at around 520° C. The sample synthesized in Example 10 showed an exotherm peak at 570° C., higher than the above temperature.

When the above-described methylsilylated sample was calcined at 600° C. to remove the methyl group, the pore size showed an increasing tendency from 2.5 nm to 2.6 nm. The sample synthesized in Example 10, on the other hand, showed a decreasing tendency from 2.2 nm to 2.0 nm even by the same treatment and the behavior was therefore different.

COMPARATIVE EXAMPLE 5

From the silicae.alumina mesopore substance synthesized in the same manner as in Comparative Example 4, the template (dodecylamine) was removed in the same manner as in Example 10 using a hydrochloric-acid-acidity alcohol solvent.

The resulting sample was trimethylsilylated in the same manner as in Comparative Example 2 and thus treated sample was filtered, washed sufficiently with acetone and subjected to vacuum drying (at 150° C. and 1 mmHg for 3 hours).

As a result of measuring the specific surface area, pore volume and pore size distribution before and after the methylsilylation by the nitrogen adsorption and desorption method, the specific surface area showed a decrease from 960 m$^2$/g to 770 m$^2$/g, the pore volume from 0.76 to 0.65 cc/g and the pore size from 3.1 nm to 2.6 nm.

The sample was dispersed in benzene and the acid amount was determined by titration with a Dimethyl Yellow indicator (pKa=+3.3) in a 0.1 N n-butylamine benzene solution. As a result, it was confirmed that the acid amount showed a drastic reduction from 0.3 mmol/g to 0.17 mol/g. The acid amount of the sample, which had been synthesized in Example 10, was determined in the same manner as in the above-described method and was found to be 0.33 mmol/g, which suggests that the acid amount is high in the sample obtained by the process of the present invention.

When the above-described methylsilylated sample was calcined at 600° C. to remove the methyl group, the pore size showed an increasing tendency from 2.6 nm to 2.7 nm. The sample synthesized in Example 10 on the other hand, showed a decreasing tendency from 2.2 nm to 2.0 nm even by the same treatment and the behavior was therefore different.

Industrial Applicability

The present invention provides a novel mesopore molecular sieve having a hydrocarbon group bonded directly to a silicon atom constituting the skeleton and production process thereof. According to the process of the present invention, it is possible to easily synthesize a novel mesopore molecular sieve having a carbon-silicon bond while controlling its content in a wide range. The mesopore molecular sieve of the present invention is superior in a catalytic performance as an acid catalyst or oxidation catalyst as compared to those having a hydrocarbon-containing silicon introduced therein by the conventional modification treatment.

What is claimed is:

1. A mesopore molecular sieve having an oxide skeleton and a hydrocarbon group bonded directly to a silicon atom on the oxide skeleton constituting the molecular sieve, wherein the content of said hydrocarbon group is from 0.01 to 0.6 mol per mol of the metal oxide.

2. The mesopore molecular sieve according to claim 1, wherein the hydrogen group is a $C_{1-16}$ hydrocarbon group or a hydrocarbon group substituted with an N-, O-, S-, P- or halogen-containing group.

3. The mesopore molecular sieve according to claim 1 or 2, wherein the oxide is a silicon oxide.

4. The mesopore molecular sieve according to claim 1 or 2, wherein the oxide is a composite of silicon oxide and at least one oxide selected from aluminum oxide, boron oxide or titanium oxide.

5. A process for producing a mesopore molecular sieve having and a hydrocarbon group bonded to a silicon atom in the molecular sieve skeleton, which comprises synthesizing the mesopore molecular sieve, in the presence of a template, from:

silane compound represented by the following formula (1):

$$R_n SiX_{(4-n)} \tag{1}$$

wherein R represents a hydrocarbon group selected from $C_{1-16}$ hydrocarbon groups and hydrocarbon groups substituted with an N-, O-, S-, P- halogen-containing group; n represents 1, 2 or 3; and X is selected from $C_{1-16}$ alkoxy groups, aryloxy groups, a hydroxyl group and halogen atoms and a plurality of X may be the same or different; and a metal oxide and/or a precursor thereof.

6. The process according to claim 5, wherein the silane compound is represented by the following formula (2):

(2)

wherein R represent a hydrocarbon group selected from $C_{1-16}$ hydrocarbon groups substituted with an N-, S-, O-, P- or halogen-containing group; $X^1$, $X^2$ and $X^3$ each is selected from $C_{1-16}$ alkoxy groups, aryloxy groups, a hydroxyl group and halogen atoms.

7. The process according to claim 5, wherein the oxide is a silicon oxide.

8. The process according to claim 5, wherein the oxide is a composite of silicon and at least one oxide selected from aluminum oxide, boron oxide or titanium oxide.

9. The process according to claim 5, wherein the silane compound is a monoalkyltrialkoxysilane or monoaryltrialkoxysilane.

* * * * *